US006711293B1

(12) United States Patent
Lowe (10) Patent No.: US 6,711,293 B1
(45) Date of Patent: Mar. 23, 2004

(54) METHOD AND APPARATUS FOR IDENTIFYING SCALE INVARIANT FEATURES IN AN IMAGE AND USE OF SAME FOR LOCATING AN OBJECT IN AN IMAGE

(75) Inventor: David G. Lowe, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/519,893

(22) Filed: Mar. 6, 2000

Related U.S. Application Data
(60) Provisional application No. 60/123,369, filed on Mar. 8, 1999.

(51) Int. Cl.$^7$ ................................................ G06K 9/68
(52) U.S. Cl. ...................................... 382/219; 382/220
(58) Field of Search ................................ 382/130, 236, 382/219, 220

(56) References Cited

U.S. PATENT DOCUMENTS

| | | | | |
|---|---|---|---|---|
| 3,069,654 | A | | 12/1962 | Hough ..................... 340/146.3 |
| 4,907,156 | A | * | 3/1990 | Doi et al. .................... 382/130 |
| 5,119,444 | A | | 6/1992 | Nishihara .................... 382/45 |
| 5,436,979 | A | * | 7/1995 | Gray et al. .................. 382/141 |
| 5,598,481 | A | * | 1/1997 | Nishikawa et al. ......... 382/130 |
| 5,617,459 | A | | 4/1997 | Makram-Ebeid et al. ..... 378/62 |
| 5,666,441 | A | | 9/1997 | Rao et al. ................... 382/203 |
| 5,764,802 | A | * | 6/1998 | Simon ........................ 382/236 |

OTHER PUBLICATIONS

Ballard, D.H., "Generalizing the Hough transform to detect arbitrary shapes", Pattern Recognition, 13, 2 (1981). pp. 111–122.

Crowley, James L., and Alice C. Parker, "A representation for shape based on peaks and ridges in the difference of low–pass transform", IEEE Trans. on Pattern Analysis and Machine Intelligence, 6, 2 (1984), pp. 156–170.

Schmid, C., and R. Mohr, "Local grayvalue invariants for image retrieval", IEEE PAMI, 19, 5 (1997), pp. 530–535.

* cited by examiner

*Primary Examiner*—Leo Boudreau
*Assistant Examiner*—Tom Y. Lu
(74) *Attorney, Agent, or Firm*—Christie, Parker & Hale, LLP (57) ABSTRACT

A method and apparatus for identifying scale invariant features in an image and a further method and apparatus for using such scale invariant features to locate an object in an image are disclosed. The method and apparatus for identifying scale invariant features may involve the use of a processor circuit for producing a plurality of component subregion descriptors for each subregion of a pixel region about pixel amplitude extrema in a plurality of difference images produced from the image. This may involve producing a plurality of difference images by blurring an initial image to produce a blurred image and by subtracting the blurred image from the initial image to produce the difference image. For each difference image, pixel amplitude extrema are located and a corresponding pixel region is defined about each pixel amplitude extremum. Each pixel region is divided into subregions and a plurality of component subregion descriptors are produced for each subregion. These component subregion descriptors are correlated with component subregion descriptors of an image under consideration and an object is indicated as being detected when a sufficient number of component subregion descriptors (scale invariant features) define an aggregate correlation exceeding a threshold correlation with component subregion descriptors (scale invariant features) associated with the object.

20 Claims, 12 Drawing Sheets

METHOD AND APPARATUS FOR IDENTIFYING SCALE INVARIANT FEATURES IN AN IMAGE AND USE OF SAME FOR LOCATING AN OBJECT IN AN IMAGE

CROSS REFERENCES TO RELATED APPLICATIONS

This application claims the benefit of U.S. provisional application No. 60/123,369, filed Mar. 8, 1999.

FIELD OF THE INVENTION

This invention relates to object recognition and more particularly to identifying scale invariant features in an image and use of same for locating an object in an image.

BACKGROUND OF THE INVENTION

With the advent of robotics and industrial automation, there has been an increasing need to incorporate computer vision systems into industrial systems. Current computer vision techniques generally involve producing a plurality of reference images which act as templates and comparing the reference images against an image under consideration, to determine whether or not the image under consideration matches one of the reference images. Thus, comparisons are performed on a full image basis. Existing systems, however, are generally accurate in only two dimensions and generally require that a camera acquiring an image of an object must be above the object or in a predetermined orientation to view the object in two dimensions. Similarly, the image under consideration must be taken from the same angle. These constraints impose restrictions on how computer vision systems can be implemented, rendering such systems difficult to use in certain applications. What would be desirable therefore is a computer vision system which is operable to determine the presence or absence of an object, in an image taken from virtually any direction, and under varying lighting conditions.

SUMMARY OF THE INVENTION

The present invention addresses the above need by providing a method and apparatus for identifying scale invariant features in an image and a further method and apparatus for using such scale invariant features to locate an object in an image. In particular, the method and apparatus for identifying scale invariant features may involve a processor circuit for producing a plurality of component subregion descriptors for each subregion of a pixel region about pixel amplitude extrema in a plurality of difference images produced from the image. This may involve producing a plurality of difference images by blurring an initial image to produce a blurred image and by subtracting the blurred image from the initial image to produce the difference image. Successive blurring and subtracting may be used to produce successive difference images, where the initial image used in a successive blurring function includes a blurred image produced in a predecessor blurring function.

Having produced difference images, the method and apparatus may further involve locating pixel amplitude extrema in the difference images. This may be done by a processor circuit which compares the amplitude of each pixel in an image under consideration, with the amplitudes of pixels in an area about each pixel in the image under consideration to identify local maximal and minimal amplitude pixels. The area about the pixel under consideration, may involve an area of pixels in the same image and an area of pixels in at least one adjacent image such as a predecessor image or a successor image, or both.

The method and apparatus may further involve use of a processor circuit to produce a pixel gradient vector for each pixel in each difference image and using the pixel gradient vectors of pixels near an extremum to produce an image change tendency vector having an orientation, the orientation being associated with respective maximal and minimal amplitude pixels in each difference image.

The plurality of component subregion descriptors may be produced by the processor circuit by defining regions about corresponding maximal and minimal amplitude pixels in each difference image and defining subregions in each of such regions.

By using the pixel gradient vectors of pixels within each subregion, the magnitudes of vectors at orientations within predefined ranges of orientations can be accumulated for each subregion. These numbers represent subregion descriptors, describing scale invariant features of the reference image. By taking images of objects from different angles and under different lighting conditions, and using the above process, a library of scale invariant features of reference objects can be produced.

In accordance with another aspect of the invention, there is provided a method and apparatus for locating an object in an image. A processor is used to subject an image under consideration to the same process as described above as applied to the reference image to produce a plurality of scale invariant features or subregion descriptors associated with the reference image. Then, scale invariant features of the image under consideration are correlated with scale invariant features of reference images depicting known objects and detection of an object is indicated when a sufficient number of scale invariant features of the image under consideration define an aggregate correlation exceeding a threshold correlation with scale invariant features associated with the object.

Consequently, in effect, correlating involves the use of a processor circuit to determine correlations between component subregion descriptors for a plurality of subregions of pixels about pixel amplitude extrema in a plurality of difference images produced from the image, and reference component descriptors for a plurality of subregions of pixels about pixel amplitude extrema in a plurality of difference images produced from an image of at least one reference object in a reference image.

Correlating may be performed by the processor circuit by applying the component subregion descriptors and the reference component descriptors to a Hough transform. The Hough transform may produce a list of reference component descriptors of objects within the image under consideration and a list of matching reference component descriptors from the library of scale invariant features. These lists may be applied to a least squares fit algorithm, which attempts to identify a plurality of best fitting reference component descriptors identifying one of the likely objects. Having found the best fitting subregion descriptors, the image from which the reference component descriptors were produced may be readily identified and consequently the scale and orientation and identification of the object associated with such reference component descriptors may be determined to precisely identify the object, its orientation, its scale and its location in the image under consideration.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
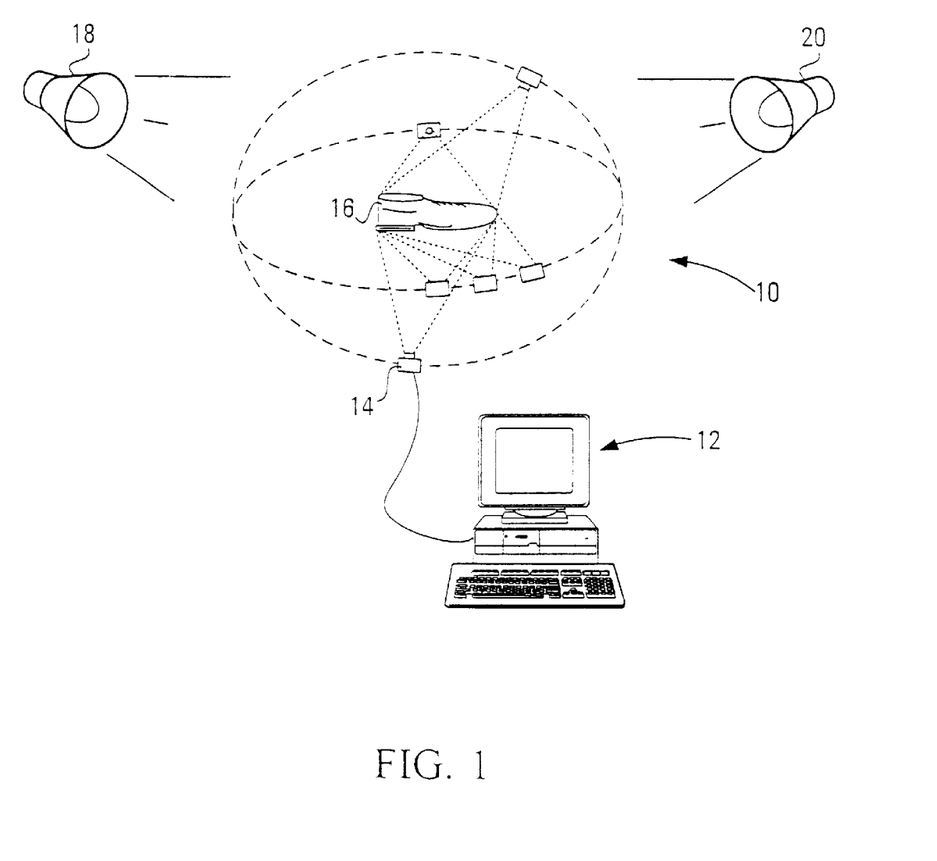
FIG. 1 is a pictorial representation of a system for identifying scale invariant features of an image and for locating an object in an image using the scale invariant features, according to a first embodiment of the invention.

Referring to FIG. 1, an apparatus for identifying scale invariant features in an image according to a first embodiment of the invention is shown generally at 10. The apparatus includes a computer shown generally at 12 operable to receive digital images from a camera 14 for producing images of an object 16 such as a shoe. Preferably, the camera 14 is operable to move among a plurality of positions about the object 16 to capture images of the object from various positions therearound, in a plurality of different lighting conditions produced by lights 18 and 20. Effectively, the camera 14, or alternatively, a plurality of cameras provides to the computer a plurality of images taken from different positions, in different lighting conditions. Images produced by the camera 14 may have pixel resolutions of 500 pixels by 500 pixels, for example, although other pixel resolution values may be substituted.

Effectively, the computer 12 is programmed to produce a plurality of difference images from each image produced by the camera 14 or plurality of cameras and for each difference image, to locate pixel amplitude extrema. Then, about each pixel amplitude extremum, a corresponding pixel region is defined and the pixel region is divided into subregions. A plurality of component subregion descriptors are then produced, for each subregion, the component subregion descriptors identifying scale invariant features in respective difference images and the collective set of component subregion descriptors for each subregion for each pixel amplitude extremum, for each difference image, represents scale invariant features of the original image. Effectively, the component subregion descriptors are comprised of a set of numbers representing the number of pixel vectors within respective predefined angular ranges relative to a key orientation in a component subregion.

Figure 2:
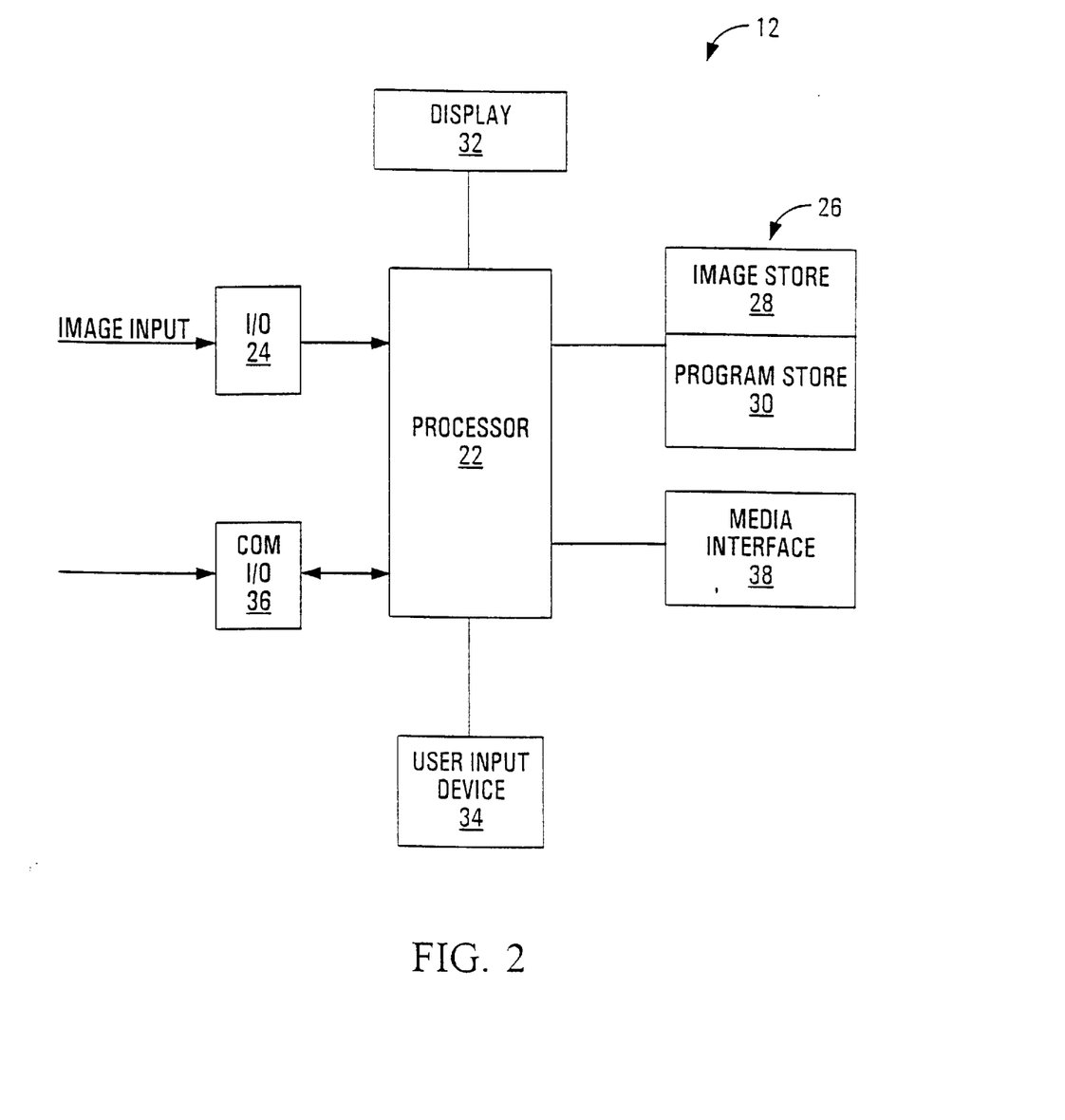
FIG. 2 is a block diagram of a computer system shown in FIG. 1.

Referring to FIG. 2, the computer 12 is shown in greater detail and includes a processor circuit shown generally at 21. In this embodiment, the processor circuit 21 includes a processor 22 and an I/O port 24 for receiving images from the camera 14 shown in FIG. 1. Also in this embodiment, the processor 22 includes a Sun Sparc 10 processor manufactured by Sun Microsystems of California. The processor circuit 21 also includes a data store 26 in communication with and accessible by the processor 22. The data store 26 may include a hard drive having an image store area 28 and a program store area 30. The program store area 30 holds programs for directing the processor 22 to receive images at the image I/O port 24 and to store such images in the image store 28.

In addition, the processor 22 is connected to a display unit 32, such as a monitor, and is further connected to a user input device 34, such as a keyboard or the like. In addition, the processor 22 may be connected to a communications I/O port 36 for connection to a modem and ultimately the internet, for example, for receiving images which may also be stored in the image store 28 or for receiving programs which may be stored in the program store 30. In addition, the processor may be in communication with a media interface 38 such as a CD ROM drive or a floppy diskette drive, for example, for receiving images or programs for storage in the image store area 28 or program store area 30 respectively.

Figure 3:
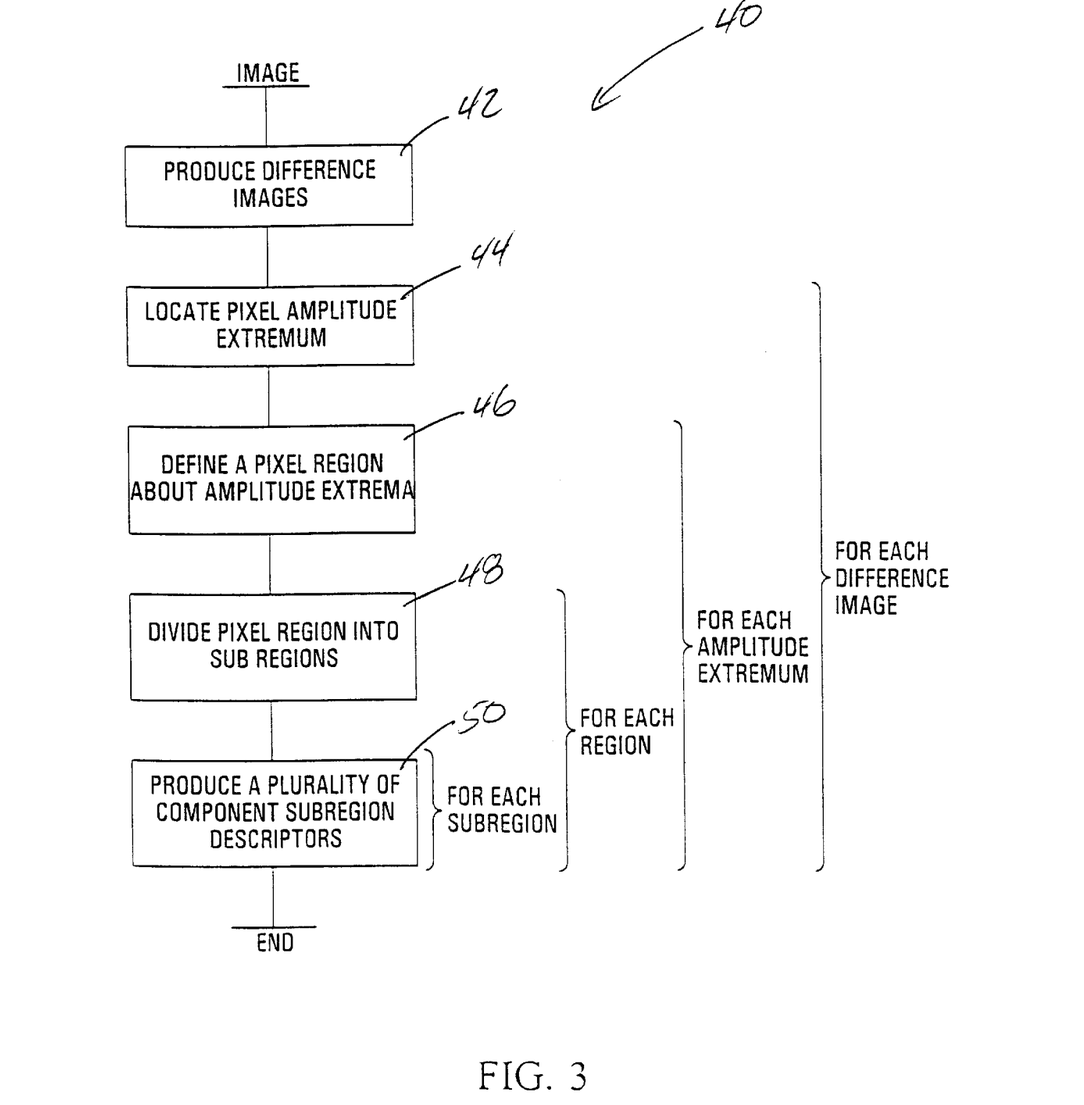
FIG. 3 is a flowchart of a process for producing a plurality of component subregion descriptors executed by a processor shown in FIG. 2.

Referring to FIG. 3, a process for identifying scale invariant features as carried out by the processor 22 shown in FIG. 2, is shown generally at 40 in FIG. 3. The process involves a first block of codes 42 which directs the processor to produce difference images from an initial reference image provided by the camera 14 shown in FIG. 1. Referring to FIG. 3, the production of difference images is followed by block 44 which directs the processor to locate pixel amplitude extrema in the difference images. Block 46 directs the processor to define a pixel region about amplitude extrema in a given difference image and block 48 directs the processor to divide a pixel region into subregions. Block 50 directs the processor to produce a plurality of component subregion descriptors for each subregion. The plurality of component subregion descriptors, defines scale invariant features of the original reference image produced by the camera.

Figure 4:
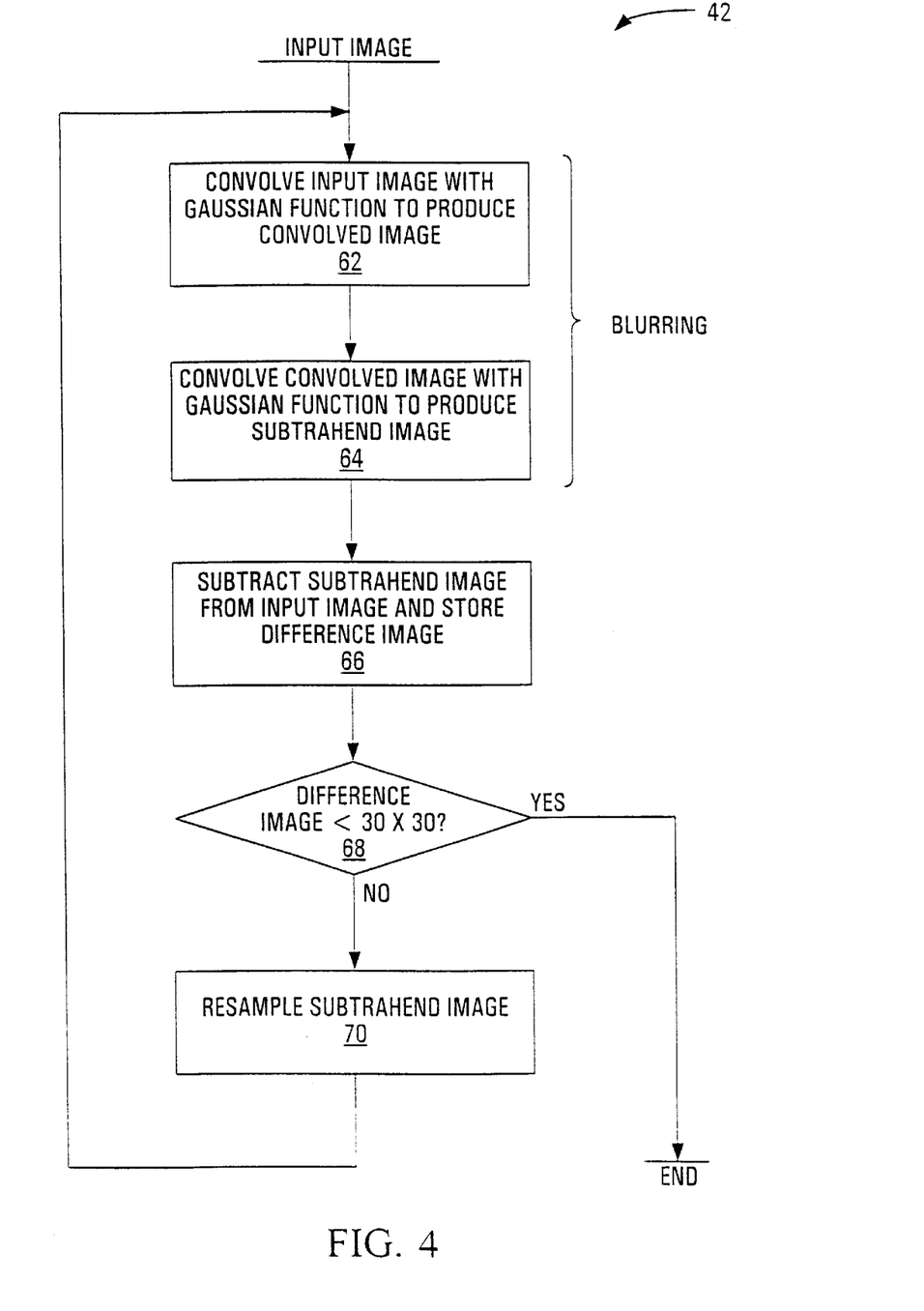
FIG. 4 is a process executed by the processor shown in FIG. 2, for producing difference images.

Referring the FIG. 4, a process for producing difference images is shown generally at 42. Effectively, the process involves successively blurring an input image to produce a blurred image and subtracting the blurred image from an initial image to produce a difference image.

In this embodiment, blurring involves 2 one-dimensional Gaussian function convolutions in the horizontal and vertical directions respectively. The first convolution is indicated by block 62 which directs the processor 22 to convolve the input image with the first one-dimensional Gaussian function in the horizontal direction to produce a first convolved image. Initially, the input to this block is the input image produced by the camera 14 shown in FIG. 1. The Gaussian function used in this embodiment is as follows:

$$g(x, \sigma) = \frac{1}{\sqrt{2\pi}\sigma} e^{-x^2/2\sigma^2}$$

In this embodiment $\sigma=\sqrt{2}$ which can be approximated with sufficient accuracy using a one-dimensional kernel with 7 sample points.

On completion of block 62, the processor 22 is directed by block 64 to convolve the convolved image with the Gaussian function in the vertical direction, to produce a subtrahend image. As both convolutions involve a Gaussian function using $\sigma=\sqrt{2}$, the effective smoothing of the subtrahend image is $\sigma=\sqrt{2}$.

Block 66 then directs the processor 22 to subtract the subtrahend image from the input image and to store the resulting difference image in the image store 28 shown in FIG. 2. After performing this subtraction, block 68 directs the processor to determine whether or not the difference image has a resolution less than a predefined value, which in this embodiment is 30×30 pixels. If the difference image has a resolution of less than 30×30, all difference images have been produced and the difference images process is completed. If the difference image has a resolution greater than 30×30, block 70 directs the processor to resample the subtrahend image with a pixel spacing of 1.5 times the pixel spacing of the subtrahend image and to revert back to block 62 using the resampled subtrahend image as the new input image.

The only constraint on resampling is that sampling be frequent enough to detect peaks in the image being sampled. By using a pixel spacing of 1.5 in the resampling step, each new sample will be a constant linear combination of four adjacent pixels. This improves computational efficiency and minimizes aliasing artifacts that would arise from changing resample coefficients. Because the subtrahend image has already been smoothed with $\sigma=2$ prior to resampling, and a further small amount of smoothing is introduced by the bilinear interpolation, the resampled image can be used as the input image in subsequent levels of calculations, without further smoothing.

Figure 5A:
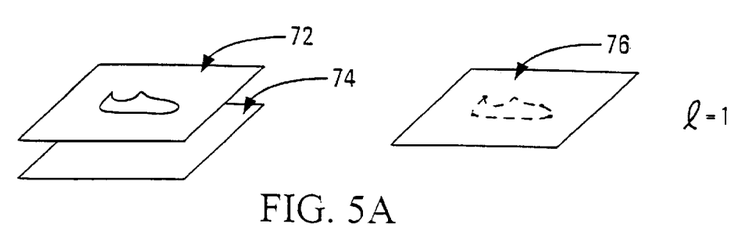
FIGS. 5a–5e represent a plurality of initial and blurred images and corresponding difference images produced therefrom.
Figure 5B:
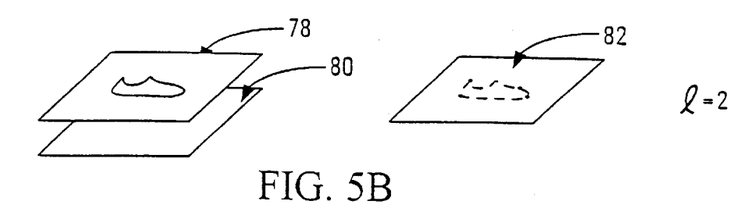
Figure 5C:
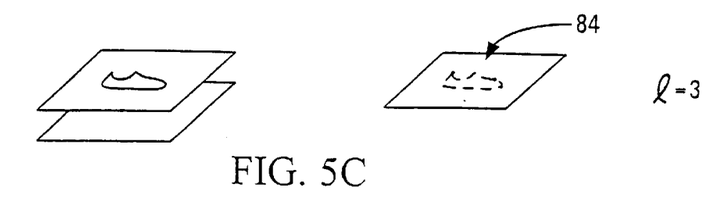
Figure 5D:
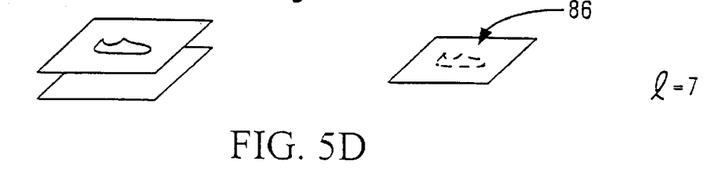
Figure 5E:
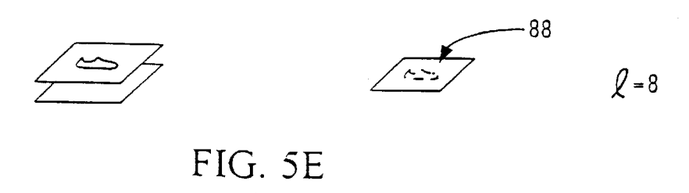

Referring to FIG. 5a, the input image produced by the camera is shown generally at 72 and the subtrahend image is shown generally at 74. The difference image is shown at 76.

The resampled subtrahend image for the first pass through the process shown in FIG. 4 is shown at 78 and acts as a new image from which a new subtrahend image 80 and new difference image 82 are produced.

FIGS. 5a through 5e show successive difference images 76, 82, 84, 86 and 88 being produced, until the final image 88 has a resolution of less than 30×30 pixels. Each difference image 76 through 88 represents a different level of an image pyramid represented by the difference images. In the example shown, there may be 8 levels of difference images, for example.

Referring back to FIG. 3, after producing difference images, the next step in the process is to locate pixel amplitude extrema in each difference image shown in FIGS. 5a through 5e.

Figure 6:
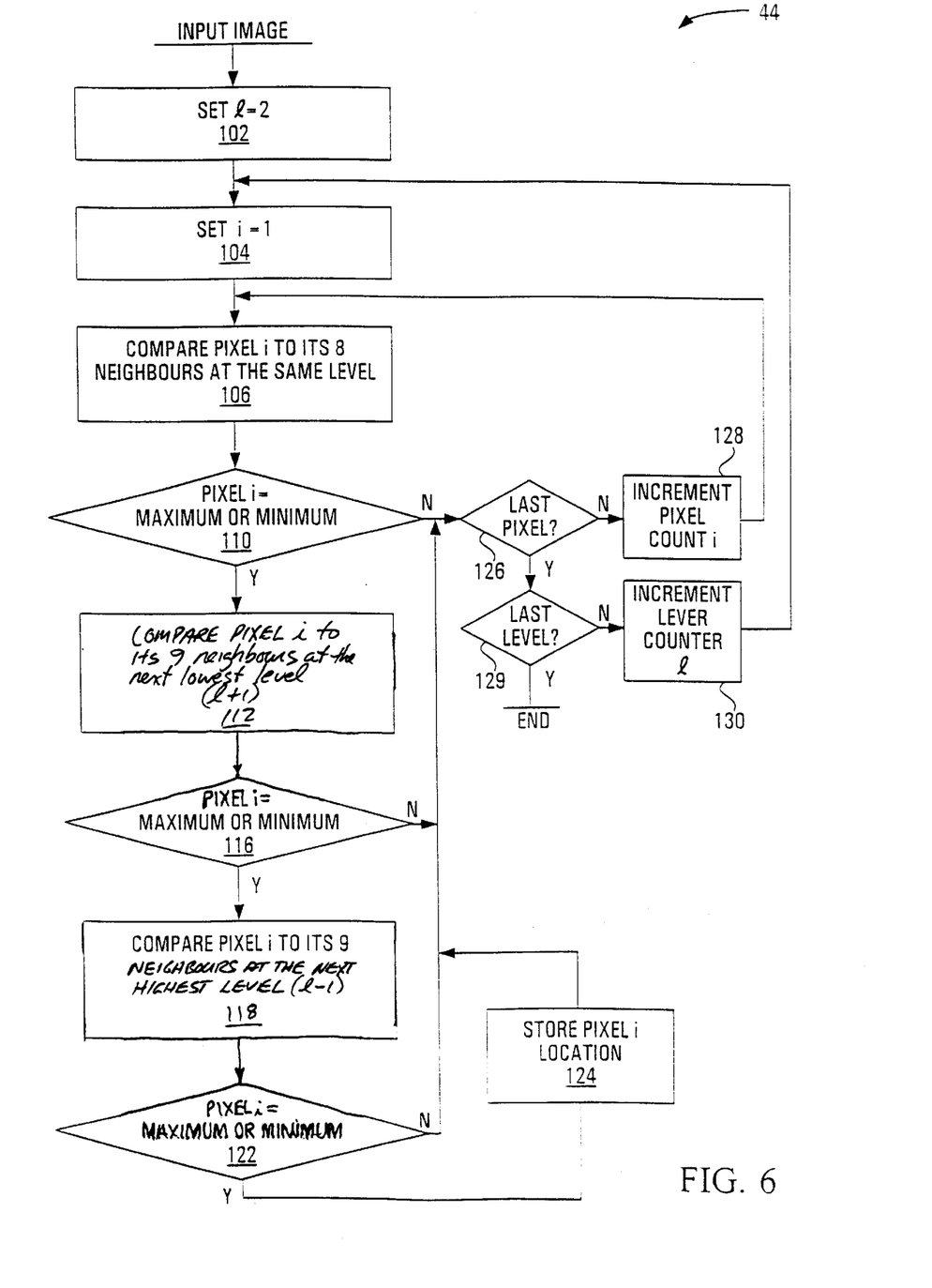
FIG. 6 is a flowchart of a process executed on the processor shown in FIG. 2 for locating pixel amplitude extrema.
Figure 7:
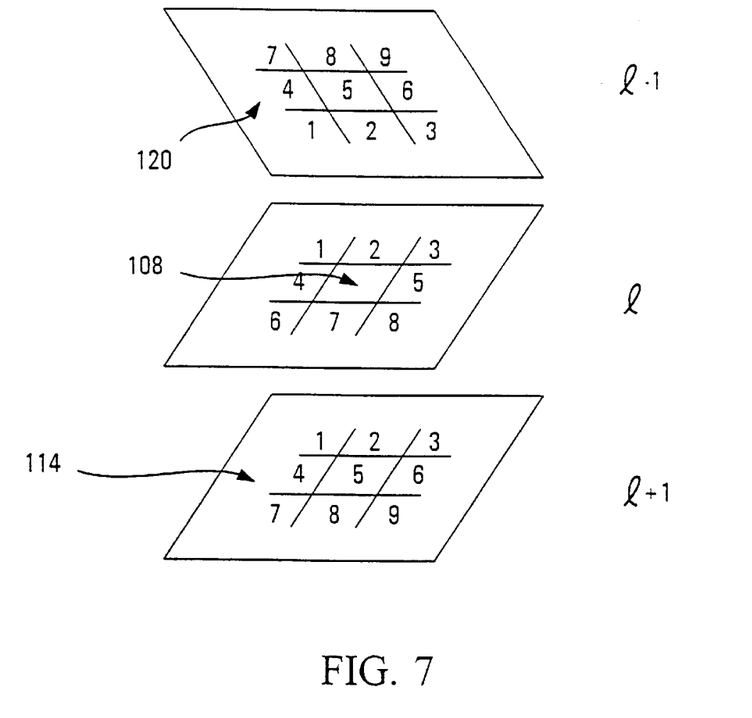
FIG. 7 is a pictorial representation of nearest neighbors in a current image and adjacent images for a pixel under consideration.

Referring to FIGS. 6 and 7, a process for determining pixel amplitude extrema is shown generally at 44 in FIG. 6. The process 44 includes a first block 102 for directing the processor 22 to set a level counter corresponding to the level of the difference image pyramid shown in FIGS. 5a through 5e, and further includes a pixel counter block 104 for setting a pixel count index i to a first pixel in a difference image under consideration.

Block 106 directs the processor 22 to compare the amplitude of pixel i to the amplitudes of its eight neighbors in the same image. This is shown in FIG. 7 where pixel i is shown generally at 108 and its eight neighbors are labelled 1 through 8 respectively, in the same level l.

Referring back to FIG. 6, block 110 directs the processor 22 to determine whether or not pixel i has an amplitude either greater than all of its eight neighbors or less than all of its eight neighbors. If not, then the processor 22 is directed to blocks 126 to 130, which direct the processor to determine whether all pixels of all images have been considered. Block 126 directs the processor to determine whether the last pixel of the current image has been considered. If it has not, then block 128 directs the processor to increment the pixel count index i, and processing continues at block 106. If at block 126 the last pixel of the current image has been considered, block 129 directs the processor to determine whether all image levels of the difference image pyramid shown in FIGS. 5a through 5e have been considered. If all levels have not yet been considered, block 130 directs the processor to increment the level counter l and the processor is directed back to block 104 to repeat the process shown in FIG. 6 for the difference image associated with the next level of the image pyramid. Otherwise, if at block 129 all levels have been considered, the process shown in FIG. 6 is ended.

If, at block 110, it is determined that pixel i is a local maximum or minimum relative to its eight neighbors, then block 112 directs the processor to compare the amplitude of pixel i to the amplitudes of its nine neighbor pixels at the next lowest level l+1, taking into account the fact that the image at the next lower level was resampled at 1.5 times the sampling spacing of the image at level l. The nine neighbors of a pixel in a next lower level are shown generally at 114 in FIG. 7 and are labelled 1 through 9, where pixel No. 5 in area 114 corresponds to the same pixel position as the pixel 108 under consideration in the previous level l.

Referring back to FIG. 6, block 116 directs the processor to determine whether the pixel under consideration in level l has an amplitude maximum or minimum relative to its nine neighbors at the next lowest level l+1 and, if not, the processor is directed to blocks 126 to 130 as described above, to determine whether all pixels of all images have been considered. Otherwise, if a maximum or minimum is detected at block 116, block 118 directs the processor to compare the amplitudes of the nine neighbors to pixel i in the next highest level l−1 as shown at 120 in FIG. 7, taking into account the fact that the image at the next highest level was resampled at $$\frac{1}{1.5}$$

times the sampling spacing of the image at level l. Again, the nine neighbors in level l−1 are labelled 1 through 9, with pixel No. 5 corresponding to the same pixel position as the pixel under consideration, 108 in level l. Referring back to FIG. 6, block 122 directs the processor to determine whether pixel i in level l is a maximum or minimum value relative to the nine neighbors 120 shown in FIG. 7, in level l+1. If not, then the processor is directed to blocks 126 to 130 as described above. Otherwise, if a maximum or minimum is detected at block 122, then the pixel location of pixel i in level l is stored in association with level l in the image store 28 shown in FIG. 2, as indicated by block 124 in FIG. 6.

After storing a pixel location in association with a given image level at block 124, the processor is directed to blocks 126 to 130 as described above, to determine whether all pixels of all levels have been considered.

It will be appreciated that the result of FIG. 6 is that the processor is directed to consider each pixel of each difference image to determine whether such pixel represents a maximum or minimum, relative to its neighbors in its own level and relative to its neighbors in images in its adjacent levels.

Most pixels will be eliminated within a few comparisons and therefore the amount of processing time used in the detection of extrema is relatively low and by comparison, much lower than that of building the pyramid.

The ability to detect relatively small objects in an image can be enhanced by first expanding the input image by a factor of 2, using bilinear interpolation, prior to building the pyramid. This enables the apparatus to detect objects as small as 20 by 20 pixels in a 500 by 500 pixel image, for example. Referring back to FIG. 3, the next step in the process is to define a pixel region about amplitude extrema and then to divide the pixel region into subregions.

Figure 8:
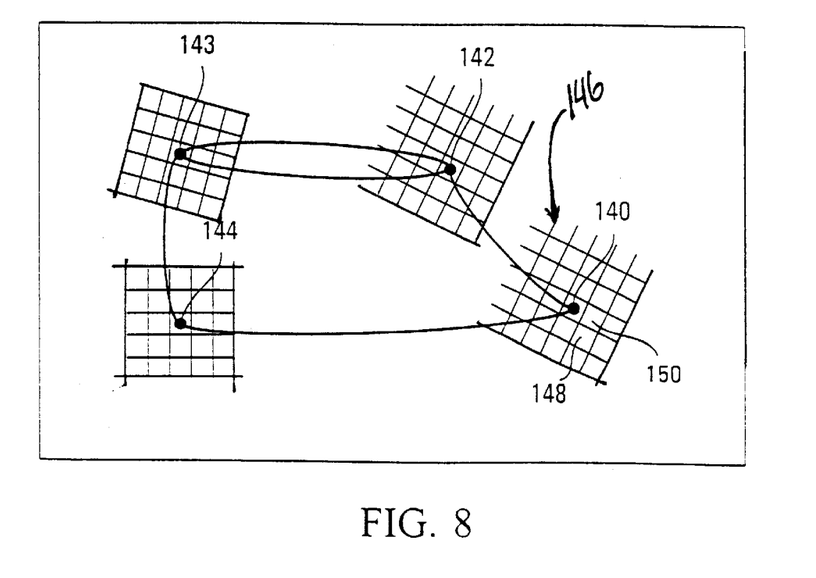
FIG. 8 is a pictorial representation of a plurality of extrema of an input image, with associated regions and subregions about such extrema.

Referring to FIG. 8, four exemplary amplitude extrema are shown at 140, 142, 143 and 144, respectively. A region is defined as a plurality of locations, arranged in an orientation about a corresponding extremum. Regions can be of any size, depending upon the resolution desired for the application, and in this embodiment it has been found that regions defined in a grid of 16×16 pixels are suitable. One such region is shown at 146 in FIG. 8. The region is divided into subregions, two of which are shown at 148 and 150, respectively. In this embodiment there are sixteen subregions of the region 146 about extremum 140.

Figure 9:
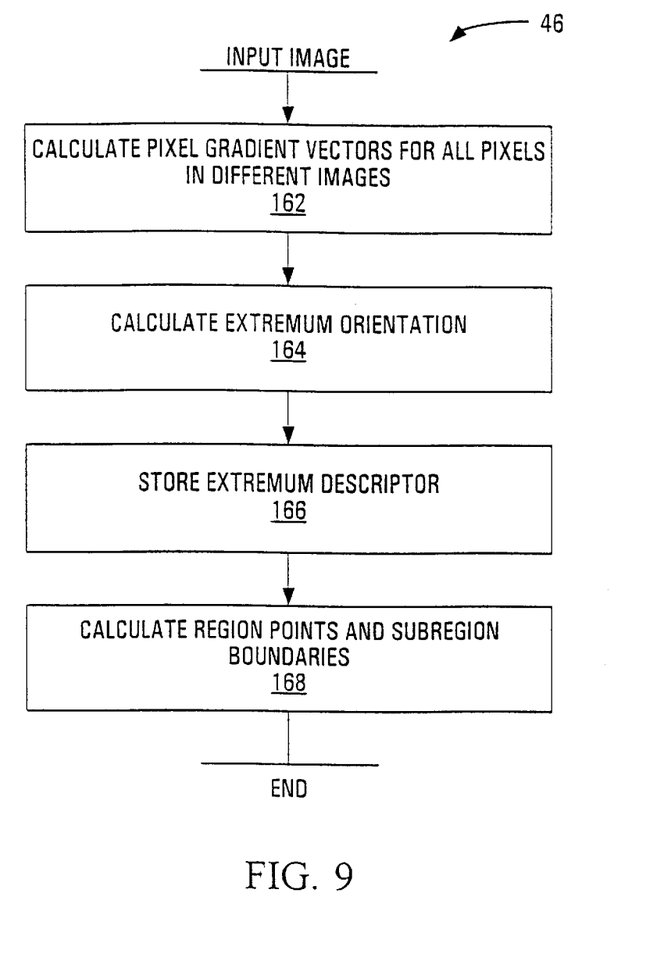
FIG. 9 is a flowchart of a process executed by the processor shown in FIG. 2, for defining pixel regions about amplitude extrema and for dividing such pixel regions into subregions.

Referring to FIG. 9, a process for defining a pixel region about amplitude extrema is shown generally at 46 and begins with a first block 162 which directs the processor 22 to calculate pixel gradient vectors for all pixels in the current difference image under consideration.

Figure 10:
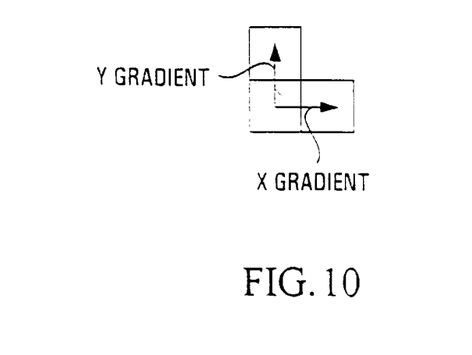
FIG. 10 is a schematic representation of pixels used to calculate a pixel vector.

Referring to FIG. 10, pixel gradient vectors are calculated by determining the amplitudes of pixels above and to the right of a pixel under consideration and taking the root of the sum of the squares of the differences between these amplitudes and the amplitude of the pixel under consideration according to the relation:

$$M_{x,y} = \sqrt{(A_{x,y} - A_{x+1,y})^2 + (A_{x,y} - A_{x,y+1})^2}$$

Similarly, an angle of the resultant vector is calculated according to the relation:

$$R_{x,y} = \tan^{-1}\left(\frac{A_{x,y} - A_{x,y+1}}{A_{x,y} - A_{x+1,y}}\right).$$

The pixel differences are efficient to compute and provide sufficient accuracy due to the substantial level of previous smoothing, in producing the difference images. Compensation for the effective half pixel shift in position resulting from considering only the pixels above and to the right of the pixel under consideration is made later. Robustness to illumination differences may be minimized by thresholding the gradient magnitudes at a value of 0.1 times the maximum possible gradient value. This is desirable because an illumination change is likely to have a much larger influence on gradient magnitude than on orientation.

Figure 11:
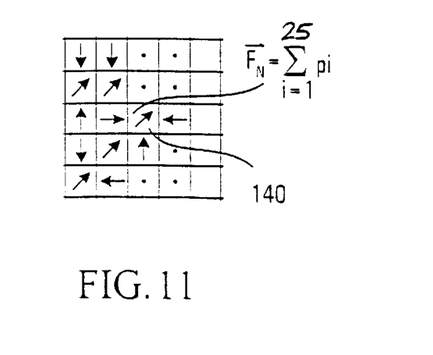
FIG. 11 is a schematic representation of pixels about an amplitude extremum which are used to calculate an orientation of the amplitude extremum.

Referring back to FIG. 9, block 164 directs the processor 22 to calculate an extremum orientation, which is accomplished by taking the vector sum of vectors associated with pixels about an extremum. For example, as shown in FIG. 11, pixels about the extremum 140 have vectors pointing in various orientations which are added together to produce a resultant vector $F_n$, the angle of which represents the extremum orientation. In this example, a 5×5 grid has been shown drawn about the pixel extremum 140 under consideration and it will be appreciated that larger grid areas may be used, depending upon the degree of resolution desired. However, it has been found that a 5×5 grid provides suitable results.

Alternatively, the extremum orientation may be determined by determining a peak in a histogram of local image gradient orientations. An orientation histogram may be created using a Gaussian weighted window with a σ of 3 times that of the current smoothing scale, which is applied to the local orientations, $R_{x,y}$, around the extremum location, for example.

Referring back to FIG. 9, after calculating the extremum orientation, block 166 directs the processor 22 to store an extremum descriptor in association with the extremum in the image store 28 shown in FIG. 2. The extremum descriptor may be a set of numbers identifying the location of the extremum in the difference image, an identification of the difference image and a number representing the extremum orientation, for example.

Figure 12:
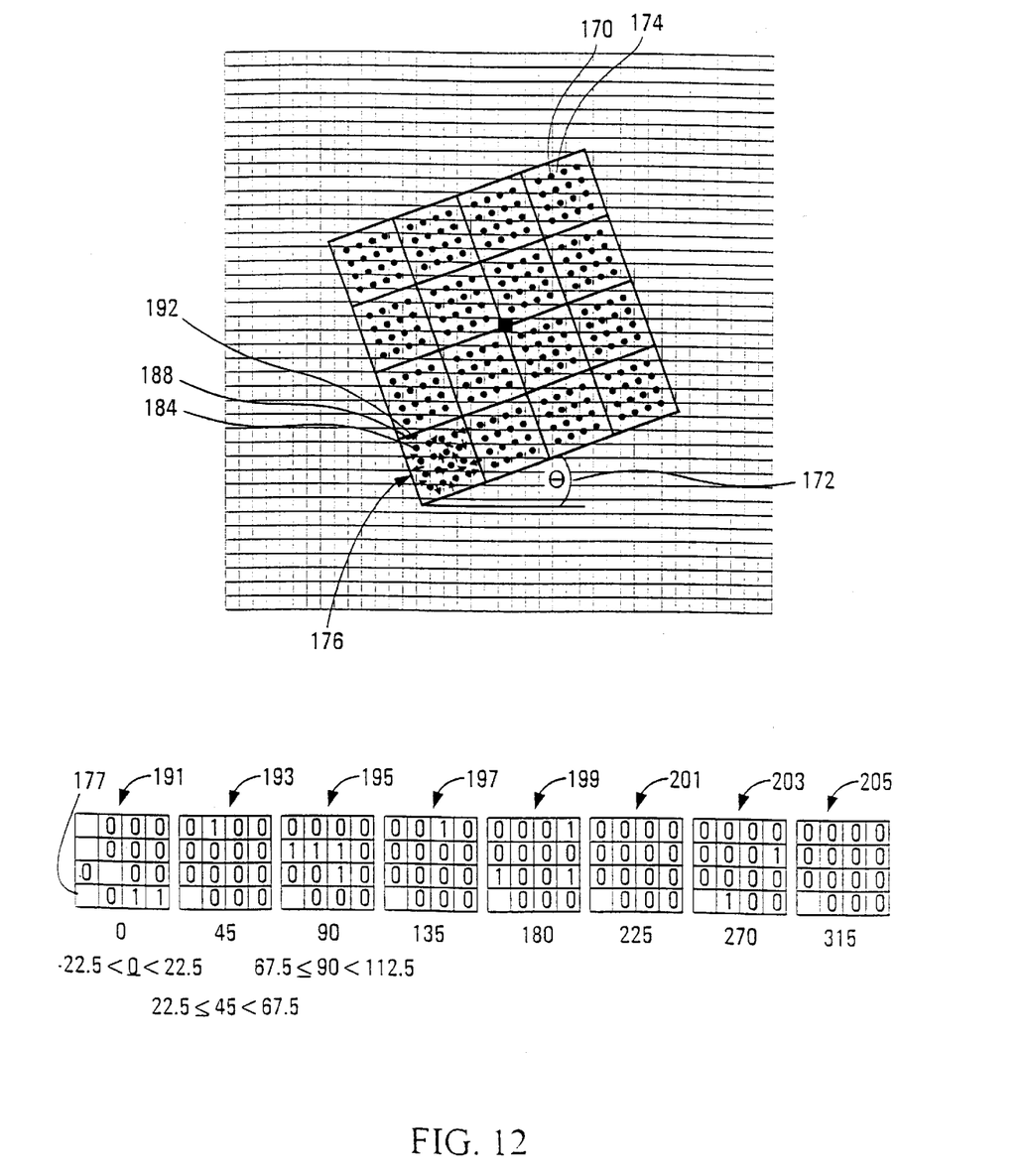
FIG. 12 is a pictorial representation of a region about an amplitude extremum, which has been divided into a plurality of subregions.

Process block 168 in FIG. 9 then directs the processor 22 to calculate region points and subregion boundaries about a given extremum. An example of this is shown in FIG. 12 in which points of interest such as point 170 shown in FIG. 12 are calculated to lie on a 16×16 pixel grid at a vertical and horizontal spacing corresponding to the spacing between pixels in the image under consideration, the grid being at an angle θ 172 equal to the extremum orientation calculated at block 164 in FIG. 9. Consequently, the points of interest 170 do not necessarily lie directly on pixels such as 174 shown in FIG. 12. Nevertheless, in this embodiment the 16×16 grid is broken into subgroups of 16 pixels representing respective subregions, one of which is shown generally at 176 in FIG. 12.

Each scale invariant feature of the entire region is represented by eight angular component sets 191, 193, 195, 197, 199, 201, 203 and 205, each with 16 subcomponent elements, one of which is shown at 177. Each set represents an angular orientation range and in particular, represents accumulated sums of magnitude values of each pixel vector, adjusted in angle for the extremum orientation, within a corresponding angular range relative to the extremum orientation for each subregion.

In this embodiment, eight angular orientation ranges are specified, the first range being labeled the zero range 191 and extending from −22.5° to 22.5°, the second range being labeled 193 and extending between +22.5° and 67.5°, the third range being labeled 195 and extending from 67.5° to 112.5°, etc. The remaining ranges are calculated similarly to define 45° sectors centred about their respective labels. Consequently, the ranges are identified as 0, 45, 90, 135, 180, 225, 270, and 315, respectively.

The elements of the angular component sets have a one to one correspondence with respective subregions and represent the accumulated sum of all pixel vectors within a given angular range, within the corresponding subregion. For example, element 177 represents the accumulated sum of pixel vectors within the zero range in subregion 176. Each element is effectively a component subregion descriptor.

Figure 13:
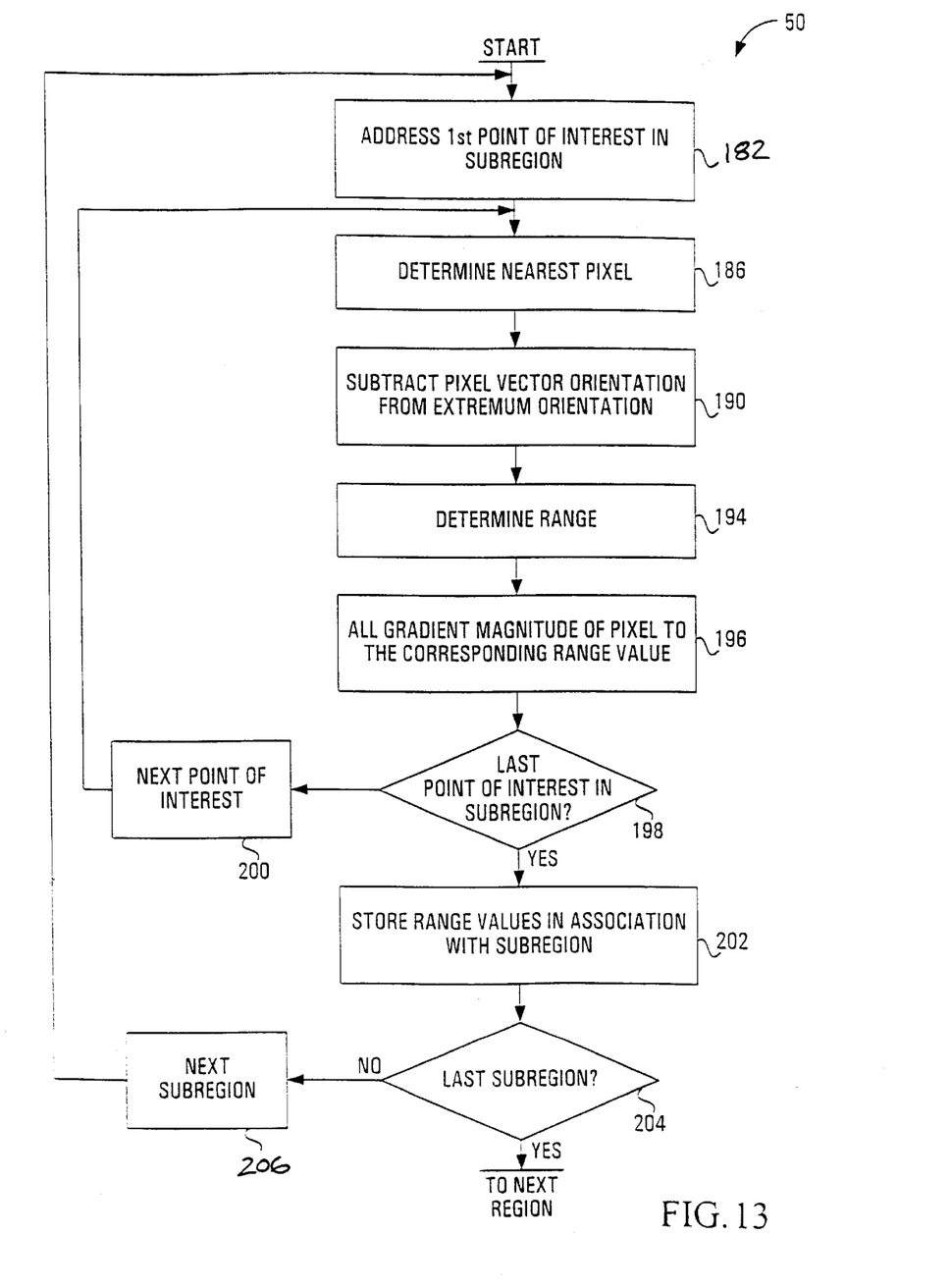
FIG. 13 is a flowchart of a process executed by the processor shown in FIG. 2, for producing a plurality of component subregion descriptors for an amplitude extremum in an image.

Referring to FIG. 13, a process for producing a plurality of component subregion descriptors is shown generally at 50 and begins with a first block 182 which directs the processor 22 to address the first point of interest in the subregion. In this embodiment, for example, the first point of interest is indicated at 184 in FIG. 12. Referring to FIG. 13, block 186 then directs the processor to determine the nearest pixel which is indicated in FIG. 12 at 188. Referring back to FIG. 13, block 190 directs the processor to subtract the pixel vector orientation from the extremum orientation θ to produce an extremum reference vector 192 shown in FIG. 12. In this embodiment, if the pixel vector orientation is 45° and the extremum orientation θ is 45°, then the extremum vector 192 has an angular orientation of zero.

Referring back to FIG. 13, block 194 directs the processor to determine which of the angular ranges 191–205 the first pixel vector falls into. Assuming the first pixel vector has an orientation of 0, block 196 in FIG. 13 directs the processor 22 to increase the number in element 177 by the magnitude of the first pixel vector.

Block 198 then directs the processor 22 to determine whether or not the last point of interest in the subregion has been examined and if not, then block 200 directs the processor to address the next point of interest in the subregion and then to resume processing at block 186.

If at block 198, the last point of interest in the subregion has been examined, then block 202 directs the processor 22 to store the angular component sets and their associated component descriptor elements in association with the region. Thus, it will be appreciated that for each full region, there are eight sets of component subregion descriptors for a total of 128 numbers, representing the entire region about the extremum. The eight sets of component subregion descriptors represent one scale invariant feature of the image.

Referring back to FIG. 13, block 204 directs the processor 22 to determine whether or not the last subregion within the region has been addressed and if not, then block 206 directs the processor to address the next subregion and to resume processing at block 182 whereby the above process is repeated. Consequently, the above process is repeated for each subregion until all subregions in the region have been examined, at which point the processor is directed to perform the above process on the next extremum associated with the current image in the difference image pyramid. When all extrema in the current image have been examined, the processor is directed to the next image in the pyramid and the above process is repeated. Thus, for each extremum in each difference image, eight sets of numbers representing component subregion descriptors are produced. These sets of component subregion descriptors essentially identify scale invariant features of the original image, from which the difference images were produced. Thus, a library of scale invariant features is produced from the various images taken by the camera at different angles and in different lighting conditions.

Referring back to FIG. 2, the program store 30 may be further programmed with codes for directing the processor 22 to locate an object in an image under consideration. The image under consideration need not be acquired by the same camera 14 shown in FIG. 1, but may merely be an image produced by any camera, in which it is desired to know whether or not an object is present.

The image produced by the camera is run through the process shown in FIG. 3, to produce a plurality of component subregion descriptors. Then, the processor correlates scale invariant features of the image under consideration, with the scale invariant features of reference images depicting known objects, produced as described above, and indicates detection of the object when a sufficient number of scale invariant features of the image under consideration define an aggregate correlation exceeding a threshold correlation with scale invariant features of an image associated with an object. More particularly, correlating involves determining correlations between component subregion descriptors for a plurality of subregions of pixels about pixel amplitude extrema in a plurality of difference images produced from the image under consideration and reference component descriptors for a plurality of subregions of pixels about pixel amplitude extrema in a plurality of difference images produced from a reference image of at least one reference object.

Figure 14:
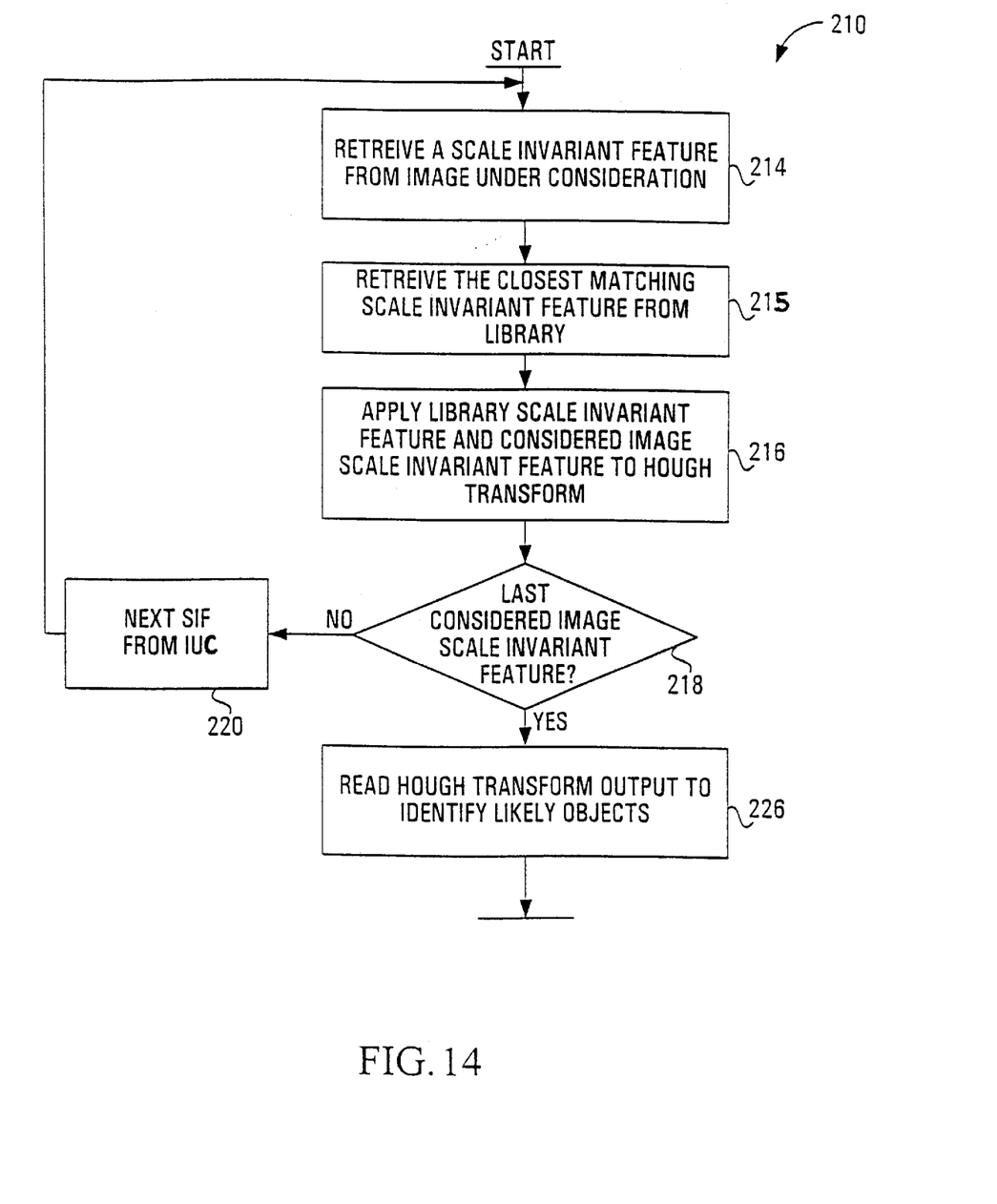
FIG. 14 is a flowchart of a process executed by the processor shown in FIG. 2, for identifying likely objects in an image under consideration.

To achieve this correlation, a process such as that shown at 210 in FIG. 14 is executed by the processor 22. Block 214 directs the processor to retrieve a group of eight sets of component subregion descriptors representing a scale invariant feature of the image under consideration. Block 215 then directs the processor to retrieve the closest matching group of eight sets of component subregion descriptors representing a scale invariant feature, from the library, which is defined as the feature having the minimum sum of squared differences of each descriptor in each set. This can be found by computing distance to each descriptor in turn. This could also be performed by applying the well-known k-d tree algorithm.

Block 216 directs the processor to apply the groups representing the library scale invariant feature and the considered image scale invariant feature to a Hough transform. Block 218 then directs the processor to determine whether or not the last groups representing the last image scale invariant feature has been considered and if not, block 220 directs the processor to address the next group representing the next scale invariant feature of the image under consideration and to resume processing at block 214.

If the last scale invariant feature has been considered, then block 226 directs the processor to read the Hough transform output to identify likely objects containing three or more scale invariant features that match, between the image and the library. Effectively, the Hough transform provides a list of likely objects, based on the scale invariant features associated with such objects in the library, together with a list of scale invariant features of the image under consideration, which match scale invariant features from the library.

Figure 15:
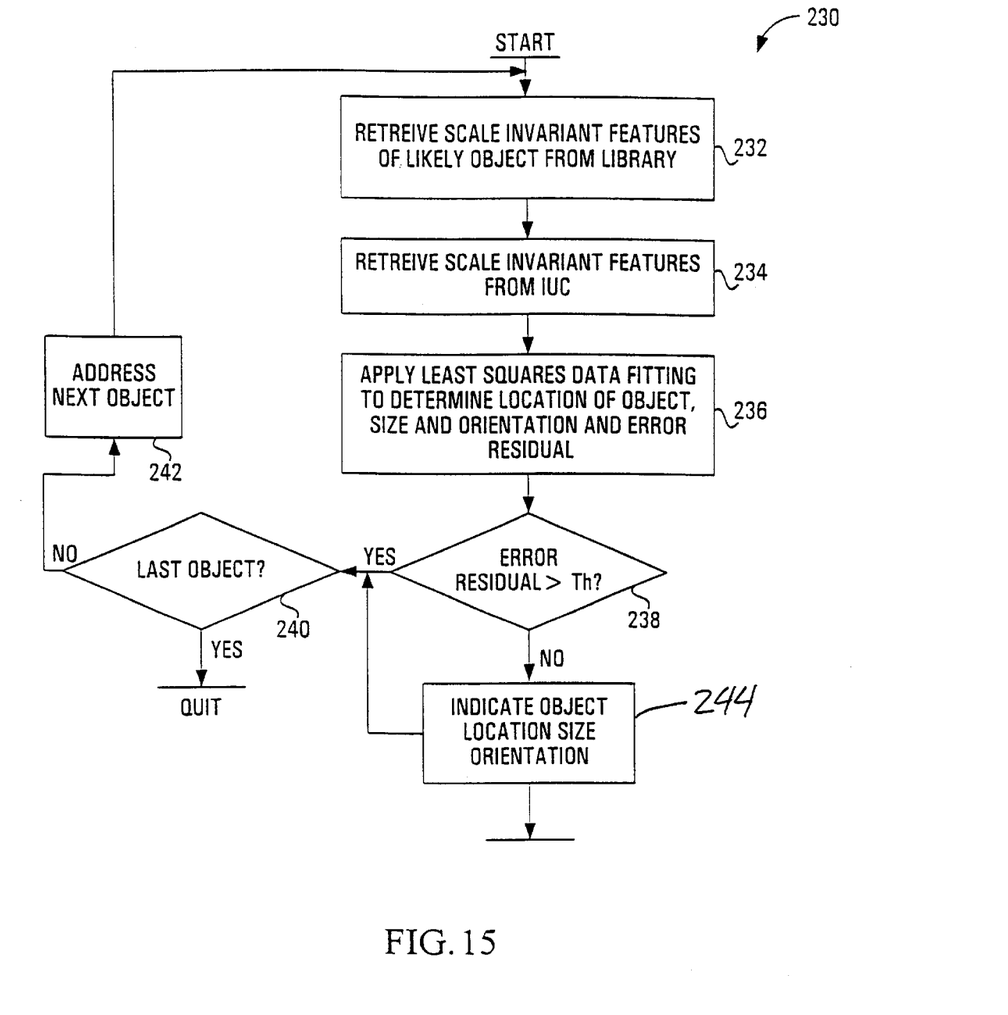
FIG. 15 is a process executed by the processor shown in FIG. 2 for applying a least squares data fitting algorithm to scale invariant features of objects in the list produced by the process shown in FIG. 14, to indicate the presence or absence of objects in the image under consideration, and for indicating the location, size and orientation of the object in the image under consideration.

After having produced a list of likely objects and matching features, each object on the list is applied to a process as shown at 230 in FIG. 15 which applies a least squares data fitting algorithm to the groups of component descriptors which represent scale invariant features associated with the object and to the matching groups of component descriptors representing scale invariant features of the image under consideration, to determine the degree of matching. If the degree of matching is high, then the object is indicated as being present in the image, and if not, then a further object on the list is considered. This process is shown generally at 230 in FIG. 15 and begins with a first block 232 which directs the processor 22 to retrieve the groups of component descriptors representing scale invariant features of a likely object produced by the Hough transform mentioned with respect to FIG. 14, from the groups of component descriptors in the library of scale invariant features. Block 234 then directs the processor to retrieve the matching scale invariant feature groups of component descriptors from the image under consideration. Block 236 directs the processor to apply the retrieved groups of component descriptors representing scale invariant features of the likely object and the retrieved matching groups of component descriptors representing scale invariant features of the image under consideration to a least squares data fitting algorithm, to determine the location of the object, the size of the object relative to the scale of the image of the scale invariant feature from the library, the orientation of the object, and an error residual value or degree of correlation.

At block 238, if the error residual value is greater than a predefined amount, then it is assumed that the object is unlikely to be depicted in the image under consideration and block 240 directs the processor to determine whether or not the last object in the list has been considered. If so, then the process shown in FIG. 15 is ended. If not, then block 242 directs the processor to address the next object in the list and then to resume processing at block 232.

If at block 238 the error residual is determined to be less than a predetermined threshold value, then block 244 directs the processor to indicate the likely object and to indicate its location, size and orientation.

In the above manner, the presence or absence of a objects for which there is a stored image in the reference library, is indicated by the above device, together with other physical information about the objects.

While specific embodiments of the invention have been described and illustrated, such embodiments should be considered illustrative of the invention only and not as limiting the invention as construed in accordance with the accompanying claims.

What is claimed is:

1. A method of identifying scale invariant features in an image defined by a plurality of pixels, the method comprising:
    locating pixel amplitude extrema in a plurality of difference images produced from said image by:
        comparing the amplitude of each pixel in an image under consideration with the amplitudes of pixels in an area about said each pixel in said image under consideration to identify local maximal and minimal amplitude pixels;
        comparing the amplitudes of said local maximal and minimal amplitude pixels with the amplitudes of pixels in a predecessor image to the image under consideration to identify possible maximal and minimal amplitude pixels and
        comparing the amplitudes of said possible maximal and minimal amplitude pixels with the amplitudes of pixels in a successor image to the image under consideration to identify actual maximal and minimal amplitude pixels; and
    producing a plurality of component subregion descriptors for each subregion of a pixel region about said pixel amplitude extrema in said plurality of difference images produced from said image.

2. The method claimed in claim 1 further comprising producing said difference images.

3. The method claimed in claim 2 wherein producing a difference image comprises blurring an initial image to produce a blurred image and subtracting said blurred image from said initial image to produce a difference image.

4. The method claimed in claim 3 wherein producing said difference images comprises successively blurring and subtracting as recited in claim 3 where said initial image used in a successive blurring function includes a blurred image produced in a predecessor blurring function.

5. The method claimed in claim 1 further comprising producing a pixel gradient vector for each pixel in each difference image.

6. The method claimed in claim 5 further comprising associating vector orientations with respective actual maximal and minimal amplitude pixels associated with each difference image.

7. The method claimed in claim 6 wherein producing a plurality of component subregion descriptors comprises producing subregion descriptors for each respective subregion in response to pixel gradient vectors of pixels within said each respective subregion.

8. The method claimed in claim 7 wherein producing each of said subregion descriptors comprises determining the number of pixel vectors at orientations within a predefined range of orientations in said subregion.

9. The method claimed in claim 7 wherein producing a plurality of subregion descriptors comprises associating with each of said descriptors a plurality of orientation ranges and determining the number of pixel vectors at orientations within respective orientation ranges, for each subregion.

10. An apparatus for identifying scale invariant features in an image defined by a plurality of pixels, the apparatus comprising a processor circuit configured to:
    locate said pixel amplitude extrema in difference images by:
        comparing the amplitude of each pixel in an image under consideration, with the amplitudes of pixels in an area about said each pixel in said image under consideration to identify local maximal and minimal amplitude pixels;
        comparing the amplitudes of said local maximal and minimal amplitude pixels with the amplitudes of pixels in a predecessor image to the image under consideration to identify possible maximal and minimal amplitude pixels;
        comparing the amplitudes of said possible maximal and minimal amplitude pixels with the amplitudes of pixels in a successor image to the image under consideration to identify actual maximal and minimal amplitude pixels; and
    produce a plurality of component subregion descriptors for each subregion of a pixel region about pixel amplitude extrema in said plurality of difference images.

11. The apparatus claimed in claim 10 wherein said processor circuit is configured to produce said difference images.

12. The apparatus claimed in claim 11 wherein said processor circuit is configured to blur an initial image to produce a blurred image and to subtract said blurred image from said initial image to produce a difference image.

13. The apparatus claimed in claim 12 wherein said processor circuit is configured to successively blur and subtract as recited in claim 12 and is configured to use a blurred image produced in a predecessor blurring function as said initial image, in a successive blurring function.

14. The apparatus claimed in claim 10 wherein said processor circuit is configured to produce a pixel gradient vector for each pixel in each difference image.

15. The apparatus claimed in claim 14 wherein said processor circuit is configured to associate vector orientations with respective actual maximal and minimal amplitude pixels associated with each difference image.

16. The apparatus claimed in claim 15 wherein said processor circuit is configured to produce subregion descriptors for each respective subregion in response to pixel gradient vectors of pixels within said each respective subregion.

17. The apparatus claimed in claim 16 wherein said processor circuit is configured to determine the number of pixel vectors at orientations within a predefined range of orientations in said subregion.

18. The apparatus claimed in claim 16 wherein said processor circuit is configured to associate with each of said descriptors a plurality of orientation ranges and to determine the number of pixel vectors at orientations within respective orientation ranges, for each subregion.

19. An apparatus for identifying scale invariant features in an image defined by a plurality of pixels, the apparatus comprising:

means for locating pixel amplitude extrema in a plurality of difference images produced from said image, said means for locating comprising:
    means for comparing the amplitude of each pixel in an image under consideration, with the amplitudes of pixels in an area about said each pixel in said image under consideration to identify local maximal and minimal amplitude pixels;
    means for comparing the amplitudes of said local maximal and minimal amplitude pixels with the amplitudes of pixels in a predecessor image to the image under consideration to identify possible maximal and minimal amplitude pixels and
    means for comparing the amplitudes of said possible maximal and minimal amplitude pixels with the amplitudes of pixels in a successor image to the image under consideration to identify actual maximal and minimal amplitude pixels; and
    means for producing a plurality of component subregion descriptors for each subregion of a pixel region about said pixel amplitude extrema in said plurality of difference images.

20. A computer readable medium comprising codes for directing a processor circuit to execute the method of claim 1.

* * * * *